(12) United States Patent
Torigoe et al.

(10) Patent No.: US 10,863,268 B1
(45) Date of Patent: Dec. 8, 2020

(54) DISPLAY DEVICE WITH PERIPHERALLY SURROUNDING AUDIO TRENCH AND ACOUSTIC PORT

(71) Applicant: Facebook Technologies, LLC, Menlo Park, CA (US)

(72) Inventors: Katherine Suzi Torigoe, San Francisco, CA (US); Bo Zheng, San Jose, CA (US); Joshua Davies, Oakland, CA (US); Ulrik Skov, Cupertino, CA (US); Joshua Warren Bingham, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/653,960

(22) Filed: Oct. 15, 2019

Related U.S. Application Data

(60) Provisional application No. 62/900,350, filed on Sep. 13, 2019.

(51) Int. Cl.
| | |
|---|---|
| *H04R 1/02* | (2006.01) |
| *H04R 3/00* | (2006.01) |
| *H04R 3/12* | (2006.01) |
| *H01M 2/10* | (2006.01) |
| *H04M 1/02* | (2006.01) |

(52) U.S. Cl.
CPC .......... *H04R 3/002* (2013.01); *H01M 2/1022* (2013.01); *H04M 1/0277* (2013.01); *H04R 1/02* (2013.01); *H04R 3/12* (2013.01)

(58) Field of Classification Search
CPC . H04R 1/00; H04R 1/02; H04R 1/025; H04R 1/028; H04R 1/20; H04R 1/24; H04R 1/26; H04R 1/28; H04R 1/345; H04R 17/00; H04R 7/045; H04R 2499/10; H04R 2499/11; H04R 2499/15; H04R 3/002; H04R 3/12; H04M 1/0277; H01M 2/1022

See application file for complete search history.

(56) References Cited

U.S. PATENT DOCUMENTS

| | | | | |
|---|---|---|---|---|
| 2003/0003945 | A1* | 1/2003 | Saiki | H04M 1/03 455/550.1 |
| 2006/0078138 | A1* | 4/2006 | Wada | H04R 1/028 381/306 |
| 2006/0279666 | A1* | 12/2006 | Soga | H04N 5/642 348/836 |
| 2010/0272307 | A1* | 10/2010 | Okumura | H04N 5/642 381/388 |

(Continued)

*Primary Examiner* — Thang V Tran
(74) *Attorney, Agent, or Firm* — FisherBroyles, LLP

(57) ABSTRACT

A display device may include (i) a display panel, (ii) a housing surrounding at least a portion of the display panel, (iii) an audio trench peripherally surrounding at least a portion of the display panel, the audio trench including a trench opening in a front side of the housing between a frame region and a peripheral region, and (iv) at least one speaker driver disposed between the display panel and a back side of the housing, the at least one speaker driver including a sound radiating surface positioned to direct sound waves into an acoustic chamber defined between the at least one speaker driver and the display panel, wherein a chamber opening is located between a lateral periphery of the acoustic chamber and the audio trench. Various other systems, devices, assemblies, and methods are also disclosed.

20 Claims, 12 Drawing Sheets

(56) References Cited

U.S. PATENT DOCUMENTS

2014/0247959 A1* 9/2014 Yamanaka ............ H04R 1/345
                                                                                          381/388
2019/0182573 A1* 6/2019 Shin ...................... H04R 17/00

* cited by examiner

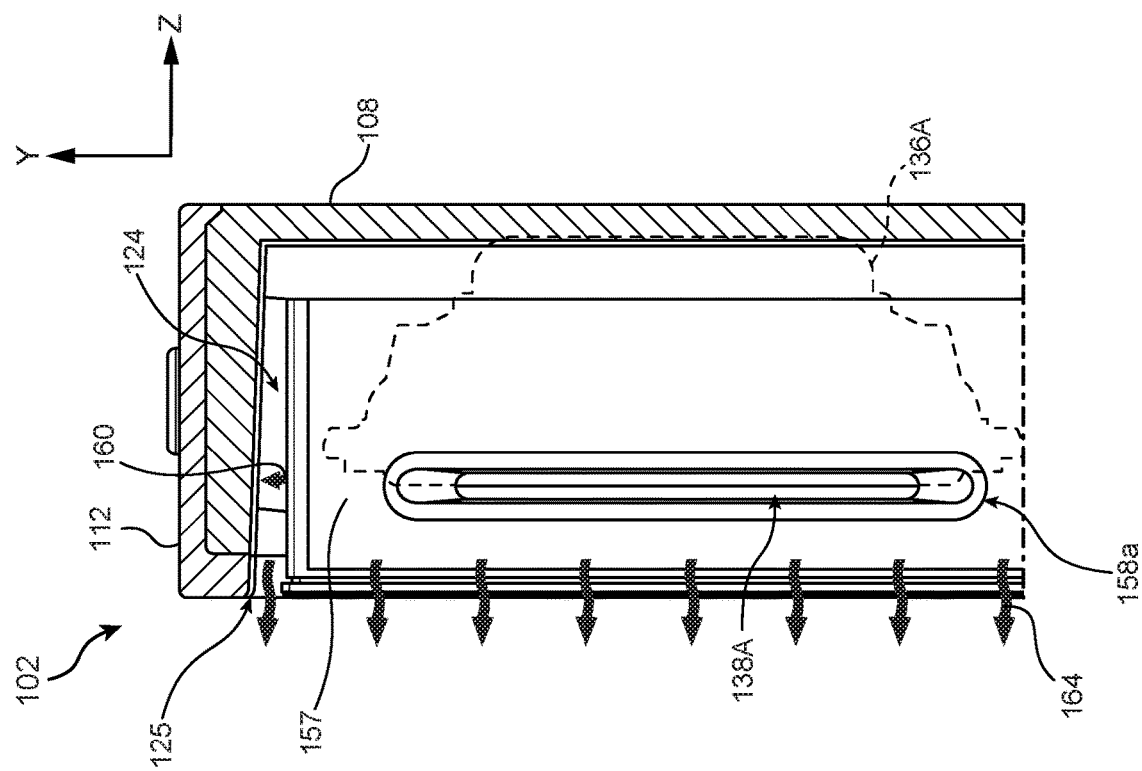
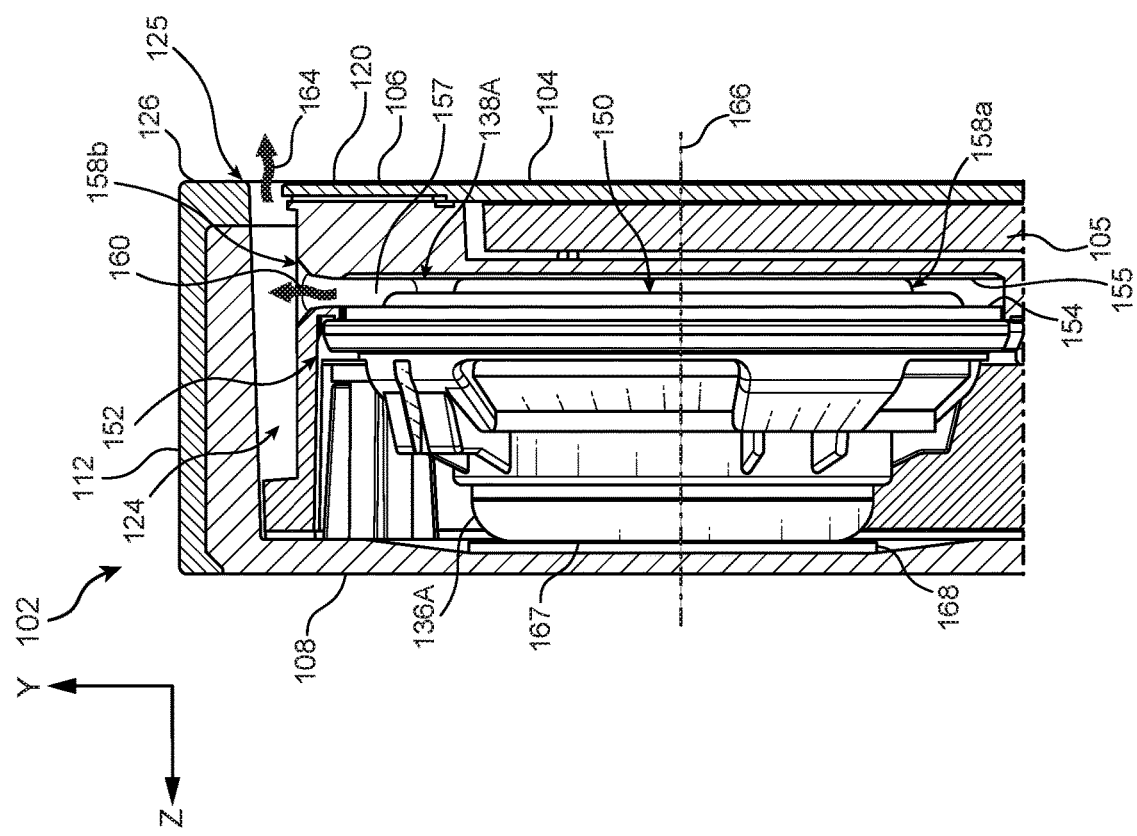
FIG. 8A
FIG. 8B

DISPLAY DEVICE WITH PERIPHERALLY SURROUNDING AUDIO TRENCH AND ACOUSTIC PORT

CROSS REFERENCE TO RELATED APPLICATION

This application claims the benefit of U.S. Provisional Application No. 62/900,350, filed 13 Sep. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 8A is a cross-sectional left side view of a portion of an exemplary display system according to some embodiments.

FIG. 8B is a cross-sectional right side view of a portion of the display system of FIG. 8A according to some embodiments.

Figure 1:
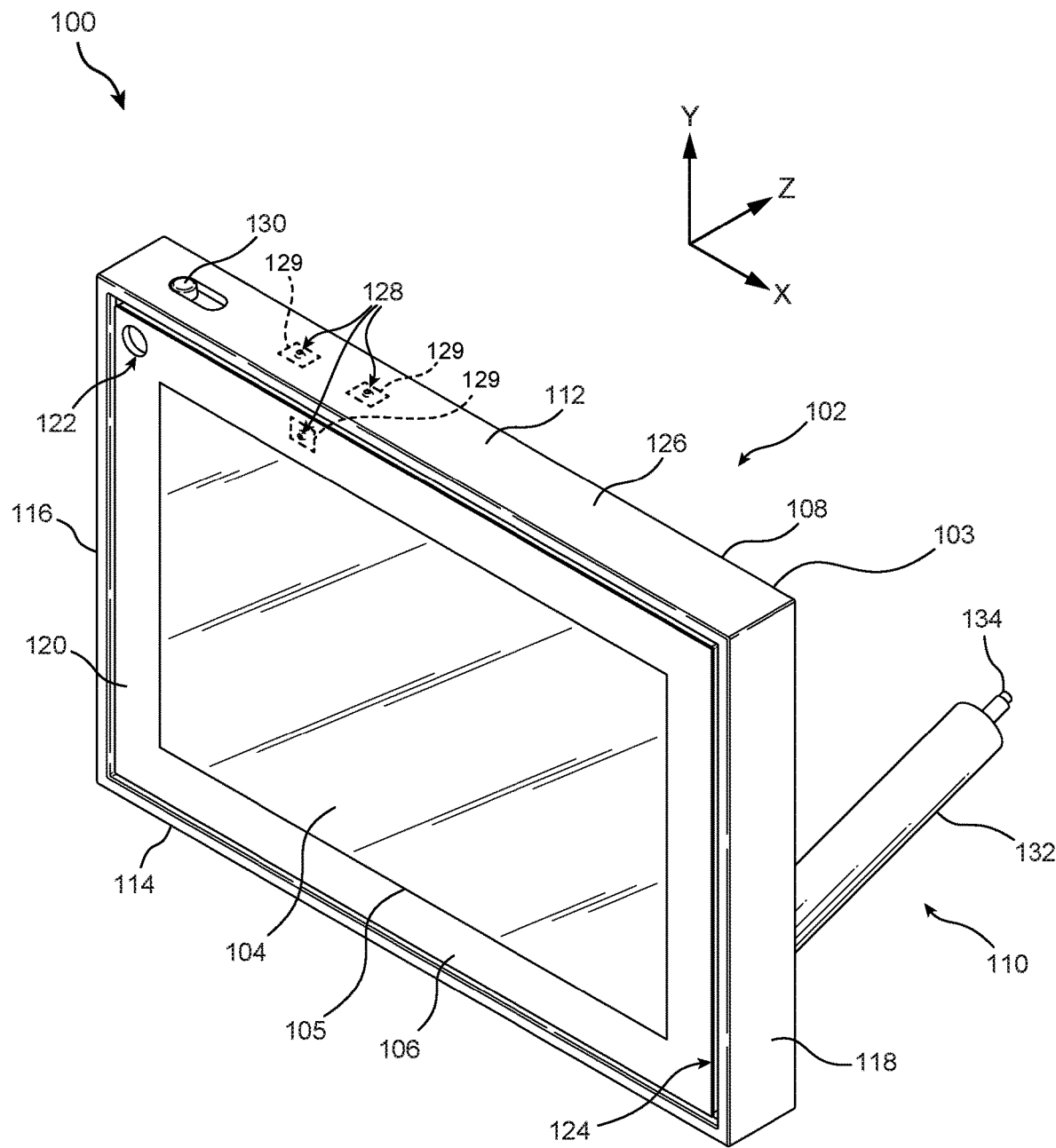
FIG. 1 is a front perspective view of an exemplary display system according to some embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to displays, including interactive and smart displays, having audio components and configurations for providing audio having enhanced sound quality from a minimized housing space. Display systems with a variety of interactive features are becoming increasingly commonplace in homes and businesses. People commonly use interactive displays, such as smart displays, that are easily accessible and can provide hands-free access to the online world and expressive interactive communication experiences with other remote users. The interactive displays commonly include microphones that allow users to easily interface with the devices using voice commands and remotely communicate with family, friends, and colleagues. Such devices also frequently include cameras and speakers to allow for image and video sharing, providing an enhanced level of interaction and connection while interacting with other parties. However, the audio capabilities provided by such devices may be relatively low due to spatial constraints. Accordingly, bulkier interactive devices or connections to external speaker accessories may be required to provide an improved user listening experience. As will be explained in greater detail below, embodiments of the present disclosure may provide an interactive display system having audio generating and transmitting features that facilitate production of high-quality audio within a minimal housing space.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-12, detailed descriptions of display systems and devices including internal audio systems and corresponding methods.

Figure 2:
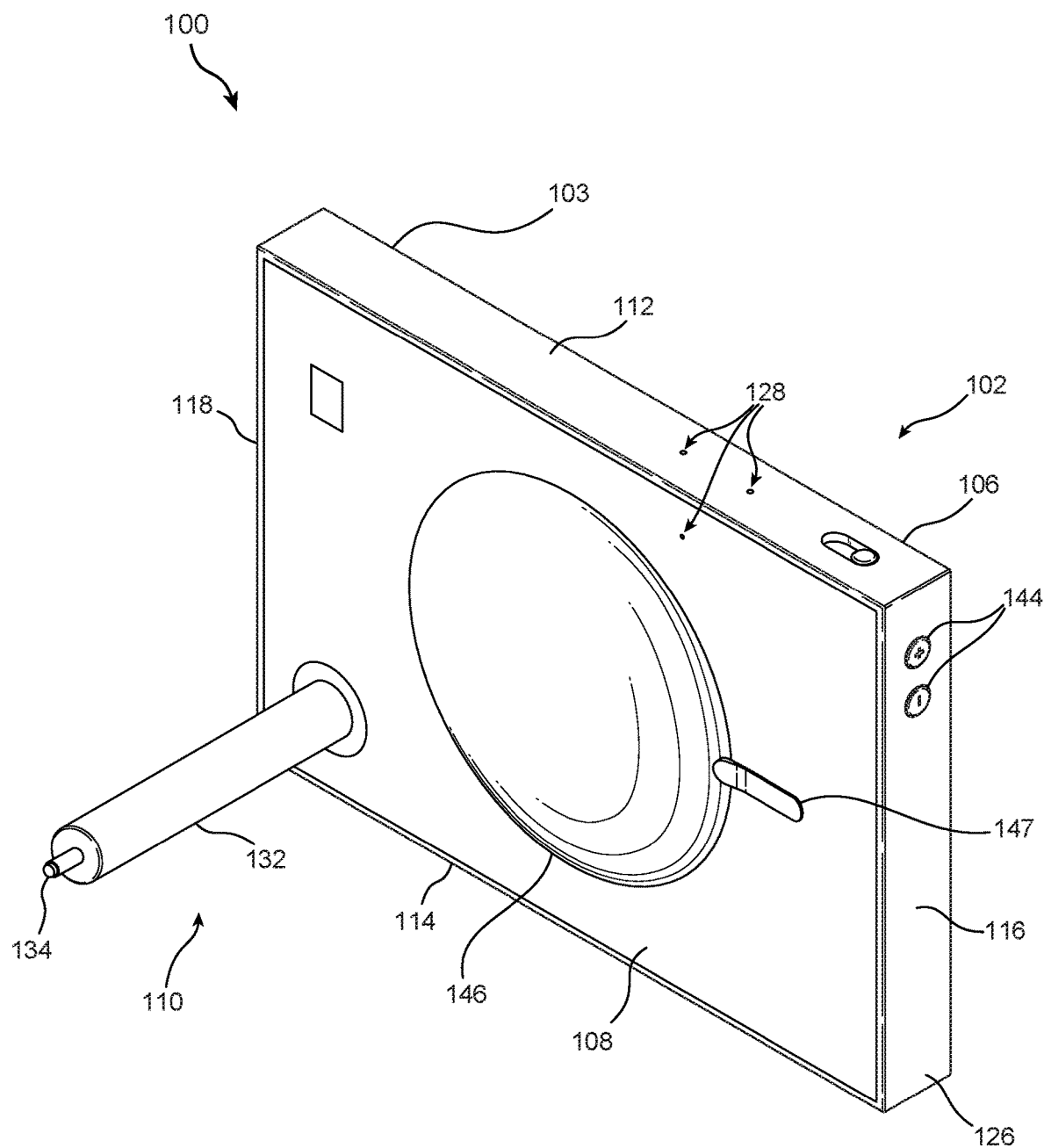
FIG. 2 is a rear perspective view of the display system of FIG. 1 according to some embodiments.
Figure 3:
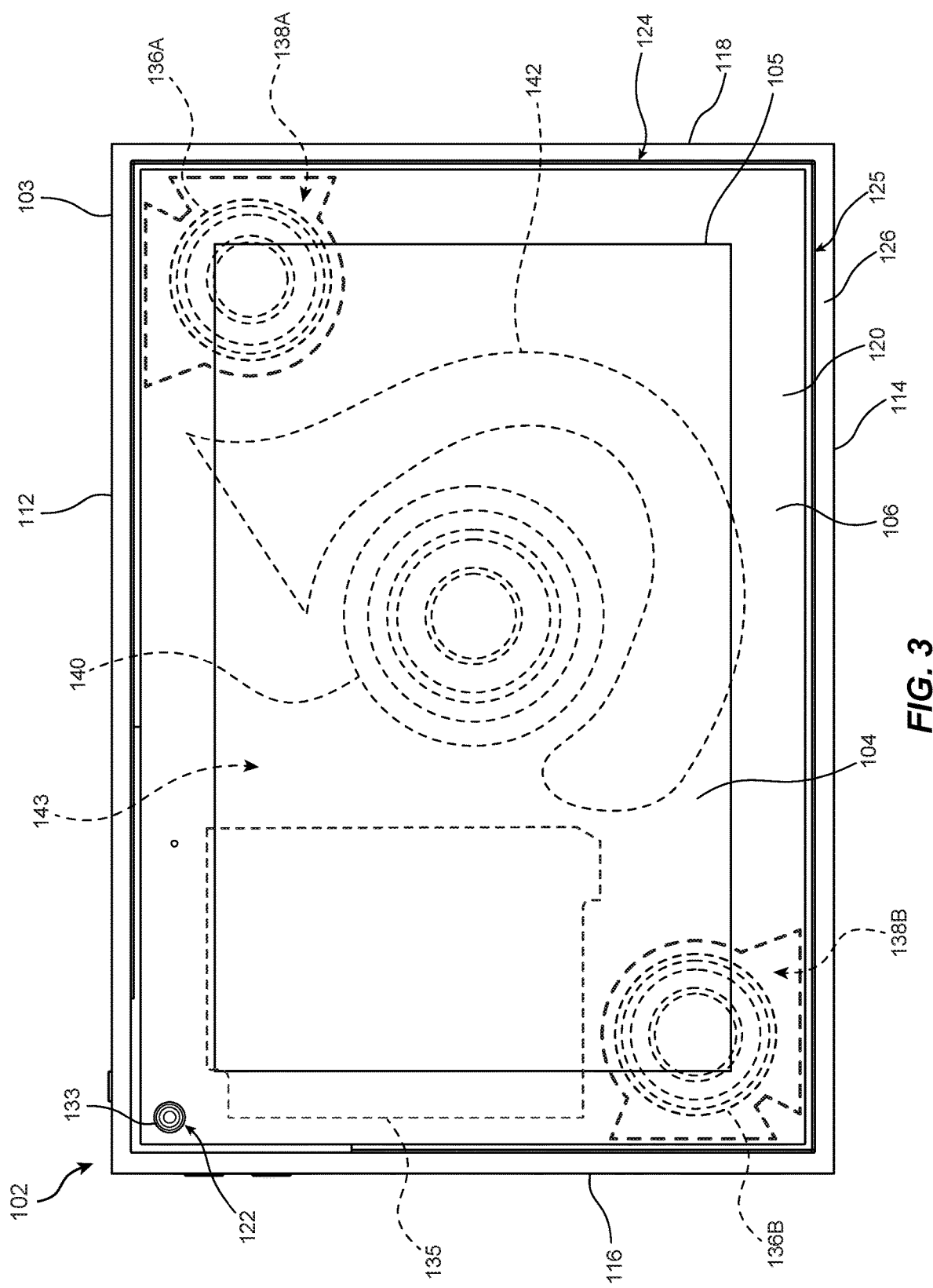
FIG. 3 is a front view of an exemplary display system illustrating certain internal audio components according to some embodiments.

FIGS. 1-3 illustrate an exemplary interactive display system in accordance with various embodiments. As shown in these figures, display system 100 may include a display device 102 that is configured to provide a user with an interactive visual and/or audio experience. Display device 102 may include various features to facilitate user interaction with display device 102 for purposes of communication with other users via an online environment. In some examples, display device 102 may also enable users to access various applications and/or online content. Display device 102 may include any suitable hardware components, including at least one physical processor and at least one memory device, and software tools to facilitate such interactions. In at least one example, display device 102 may be connected to an online and/or other networked environment via, for example, a Wi-Fi, cellular, Bluetooth, and/or a wired connection.

In various embodiments, display device 102 may include a controller 135 as illustrated, for example, in FIG. 3. Controller 135 may include any suitable system having one or more computing devices that control operation of one or more components of display device 102. For example, controller 135 may communicate with and control operation of a camera 133 and/or one or more microphones 129 of display device 102. In some examples, controller 135 may also control operation of various other components, such as a display panel 105 that displays content visible on display surface 104, an audio system that produces sound emitted by loudspeakers in display device 102, and/or any other suitable components of display system 100. Controller 135 may be disposed in any suitable location. For example, controller 135 may be disposed within housing 103 and, in some embodiments, may be disposed on a printed circuit board. Controller 135 may include at least one physical processor and at least one memory device and may be communicatively coupled with various components (e.g., via electrical wiring and/or circuitry within display device 102), such as camera 133 and/or one or more microphones 129, allowing for signals to be sent to and received from the components.

Display device 102 may include a housing 103 having any suitable exterior surface shape, such as a shape having a rectangular or substantially rectangular periphery. In some embodiments, as illustrated in FIGS. 1-3, housing 103 may include exterior sides having planar or substantially planar surfaces and/or surface portions that intersect at, for example, angular, rounded, and/or beveled junctions. For example, housing 103 of display device 102 may include a front side 106, a back side 108, a top side 112, a bottom side 114, a left side 116, and a right side 118. At least a portion of front side 106, back side 108, top side 112, bottom side 114, left side 116, and/or right side 118 may extend parallel or substantially parallel to at least two of the illustrated X-, Y-, and Z-axes.

Front side 106 of display device 102 may include a display panel 105 including a display surface 104 that provides visual content to a user. According to various embodiments, display panel 105 may include an array of pixels for displaying images and/or video viewable via a display surface 104. For example, display panel 105 may include a liquid crystal display (LCD), light-emitting diode (LED) display, organic light-emitting diode (OLED) display, an inorganic light emitting diode (ILED) display, an active-matrix organic light-emitting diode (AMOLED) display, or any other suitable display technology. In some examples, display panel 105 may include an integrated or adjacent touch sensor at or near display surface 104, such as a mutual capacitance touch sensor, a self-capacitance touch sensor, an inductive touch sensor, or any other suitable touch sensor technology that allows for user touch-based interaction via display surface 104.

In various embodiments, display surface 104 may have a rectangular or substantially rectangular periphery. Display device 102 may be configured to display images and/or video on display surface 104 in any orientation, including, for example, landscape and portrait orientations. In some examples, display device 102 may detect its current orientation (e.g., using at least one gyroscope and/or other suitable orientation sensor, or via manual input) and automatically display an image with the top of the image displayed at the top of display surface 104 such that the image appears in a correct orientation for the viewer regardless of the orientation of the display device 102.

In at least one embodiment, front side 106 of display device 102 may include a frame region 120 peripherally surrounding display surface 104. A camera opening 122 for a camera 133 (see FIG. 3) within display device 102 may be defined in frame region 120 at or near a corner of frame region 120. For example, camera opening 122 may be disposed near an intersection of top side 112 and left side 116 of display device 102. Camera opening 122 may allow passage of light to camera 133 to capture images and/or video from a local environment. As used herein, a camera may generally refer to any camera device suitable for capturing images, such as photographic and/or video images, from an environment surrounding display device 102. Examples of cameras may include, without limitation, digital cameras that convert captured light into digital signals, such as cameras having charge-coupled device (CCD) image sensors, cameras having complementary metal-oxide semiconductor (CMOS) image sensors, and/or any other suitable camera device. Camera 133 may include an image sensor array, a lens or lens array to focus light on the image sensor array, and an aperture that allows light to enter the camera. The image sensor array may include a plurality of pixel sensors (e.g., light-sensing photodiode elements) that capture and measure light emitted from various portions of the display. In some examples, camera 133 may also include a microlens array to further focus light on the pixel sensors.

As shown in FIGS. 1 and 2, display device 102 may also include an audio trench 124 disposed between frame region 120 and a surrounding peripheral region 126 of display device 102. Audio trench 124 may facilitate transmission of sound from speakers concealed within display device 102 to provide high-quality audio content to a user via front side 106. In some examples, display device 102 may include one or more speaker drivers for generating sound that is audible via, for example, audio trench 124 and/or back side 108. The speakers may include, for example, one or more speakers disposed within housing 103, such as a woofer, which may be covered by a speaker grille 146 (e.g., a mesh, screen, open cell foam, etc.) protruding from back side 108 as illustrated, and/or a pair of tweeters and/or mid-range speakers that emit sound via audio trench 124. In one example, display device 102 may also include a retaining tab 147 that, for example, provides force against speaker grille 146 to aid in securing speaker grille 146 to display device 102. Additionally or alternatively, retaining tab 147 may cover a port for connecting one or more cables (e.g., a USB cable, an HDMI cable, etc.). Display device 102 may also include various other components, such as volume buttons 144 located, for example, on left side 116 (see, e.g., FIG. 2) and/or any other suitable location. Volume buttons 144 may be utilized by a user to adjust the volume of audio produced by display device 102.

In some examples, display device 102 may include one or more microphones 129 within housing 103 that receive audio from a surrounding environment via one or more corresponding microphone openings 128 defined in, for example, top side 112, front side 106, and/or back side 108. Microphones 129 may be positioned and configured to pick up sound from various directions in the local environment around display device 102. As used herein, a microphone may generally refer to any transducer device suitable for receiving and converting sound (i.e., air pressure variations of sound waves) into electrical signals, which may be amplified (e.g., using a preamplifier) and converted from analog to digital signals (e.g., using a digital to analog convertor, DAC). Examples of microphones may include, without limitation, dynamic microphones, condenser microphones, piezoelectric microphones, fiber optic microphones, microelectromechanical systems (MEMS) microphones, and/or any other suitable types of microphones.

In various examples, peripheral region 126 of display device 102 may include top side 112, bottom side 114, left side 116, right side 118, and peripheral portions of front side 106 and/or back side 108 of display device 102. In some examples, at least a portion of peripheral region 126 may include a material that provides a suitable degree of stiction with respect to a variety of surface types to prevent sliding of display device 102 during use. Such a material may also have vibration damping properties to absorb acoustic vibrations generated by the display audio system. For example, peripheral region 126 may include a cushioning elastomeric layer (e.g., including a polyurethane polymer, such as thermoplastic polyurethane, TPU, and/or any other suitable elastomer).

According to various embodiments, display system 100 may include a support stand 110, which may function as an integrated positioning and power supply assembly. As shown in FIGS. 1 and 2, support stand 110 may be coupled to display device 102 to provide mechanical support and electrical power to display device 102. Support stand 110 may be mounted to display device 102 at back side 108 (see FIG. 2) near, for example, an intersection of bottom side 114 and right side 118 to support display device 102 in both landscape and portrait orientations. Camera 133 (see FIG. 3) may be positioned adjacent front side 106 near an intersection of top side 112 and left side 116 (see FIG. 1) so that camera 133 is disposed in close proximity to a top edge of display surface 104 when display device is positioned in either of the landscape and portrait orientations to facilitate capture of a user and their surroundings while the user views and interacts with content displayed on display panel 105. Support stand 110 may further include an elongated support member 132 for physically supporting display device 102 in a selected orientation on an external surface. Electrical wiring for supplying power to display device 102 may extend from display device 102 through an interior of support member 132. An electrical cord 134 for providing electrical power to display device 102 may protrude from a portion (e.g., a distal end) of support member 132.

According to at least one embodiment, display device 102 may also include a privacy switch 130 that is accessible, for example, at top side 112. Privacy switch 130 may enable a user to select between various privacy modes in which a camera and/or microphones of display device 102 are enabled or disabled. In some examples, a camera shutter may be positionable by privacy switch 130 to cover at least a portion of camera opening 122, thereby physically blocking the field of view of camera 133 to enhance user privacy.

According to some embodiments, at least one computer-implemented application executed by one or more physical processors of display device 102 and/or external to display device 102 may identify the presence of one or more users and/or user features (e.g., facial features, hands, etc.) and may locate and/or track their location in the field of view of camera 133. In some examples, the at least one application may zoom, pan, crop, and/or otherwise modify one or more portions of a captured image to digitally enhance a viewing experience for other users receiving such images (e.g., other users communicating remotely with a user of display device 102). In various examples, the at least one application may add image elements to images captured by camera 133 and/or may obscure portions of the captured images to generate enhanced or artificial-reality images and/or to block the appearance of selected objects in the field of view of camera 133. Such applications may be utilized to produce images that are visible to a user on display device 102 and/or to other users in communication with display device 102 via, for example, a connected network.

Additionally or alternatively, the at least one application may be utilized to perform various operations on display device 102. For example display device 102 may be operated in an ON state during which images and/or audio are captured and/or presented by display device 102 when an individual is detected within at least a portion of the field of view of camera 133. Display device 102 may be switched to a standby or OFF state when an individual is not detected within at least the portion of the field of view of camera 133 (e.g., after an individual has been absent from the field of view fora threshold period of time). In some examples, images captured by camera 133 may be utilized for biometric purposes to identify physical features of an individual (e.g., facial features) and limit access to allow only authorized users. Additionally or alternatively, user gestures (e.g., hand, arm, and/or facial gestures) for controlling various operations of display device 102 (e.g., volume control, image adjustment, ON/OFF state, etc.) may be detected via images captured by camera 133. In some examples, the at least one application may use images captured by camera 133 in conjunction with audio captured by microphones 129 of display device 102 to perform various functions, such as one or more operations described above.

FIG. 3 is a front view of display device 102 showing certain internal components, including audio components, positioned within housing 103 of display device 102. In some embodiments, display device 102 may include an audio trench 124 peripherally surrounding at least a portion of display panel 105. For example, as shown in FIG. 3, audio trench 124 may be disposed around at least a portion of display panel 105 and may include a trench opening 125 defined in front side 106 between frame region 120 and peripheral region 126. Audio trench 124 may laterally surround a majority of display panel 105, and in some examples, may entirely surround the display panel 105 as illustrated.

In various embodiments, display device 102 may also include at least one speaker driver disposed between display panel 105 and back side 108 of housing 103. For example, as illustrated in FIG. 3, a pair of speaker drivers, such as first and second speaker drivers 136A and 136B, may be positioned within housing 103 so as to direct sound waves into respective first and second acoustic chambers 138A and 138B defined between display panel 105 and each of first and second speaker drivers 136A and 136B. Audio trench 124 may extend around the lateral periphery of display panel 105 from a region adjacent first acoustic chamber 138A to another region adjacent second acoustic chamber 138B. As will be described in greater detail below, at least one opening may provide an acoustic passage between first acoustic chamber 138A and audio trench 124 and at least one additional opening may provide another acoustic passage between second acoustic chamber 138B and audio trench 124.

As described above, housing 103 may have a substantially rectangular peripheral profile formed by lateral sides of housing 103, including top side 112, bottom side 114, left side 116, and right side 118. Further, audio trench 124 may include a first section extending parallel or substantially parallel to top side 112 and/or or bottom side 113 and a second section extending perpendicular or substantially perpendicular to the first section and parallel or substantially parallel to left side 116 and/or right side 118 of housing 103.

As illustrated in FIG. 3, out of four corner regions of housing 103, first speaker driver 136A may be located nearest a corner region at an intersection of a first lateral side, such as top side 112, and a second lateral side, such as right side 118. Additionally, second speaker driver 136B may be located nearest another corner region at an intersection of a third lateral side, such as left side 116, and a fourth lateral side, such as bottom side 114. First and second speaker drivers 136A and 136B may be separately driven to provide a stereo listening experience. In some examples, volume levels individually output by each of first and second speaker drivers 136A and 136B may be selected such that a perceived source of output audio, as heard by a user, corresponds to a location of content displayed on display panel 105. For example, first and second speaker drivers 136A and 136B may be controlled so that the source of audible content, as perceived by a user, corresponds to the location of concurrently displayed image content, such as an image of another remote user shown on display panel 105.

In some embodiments, the speaker drivers may be positioned away from various other components so as to reduce the overall thickness of housing 103 between the front and back sides 106 and 108 (e.g., by avoiding overlap between the speaker drivers and the components) and/or to prevent undesired electrical and/or vibrational interference with the components. For example, as illustrated in FIG. 3, camera 133 may be disposed within housing 103 at a location separated from first and second speaker drivers 136A and 136B. Camera 133 may, for example, be located at or near an upper corner region of housing 103 adjacent an intersection of top side 112 and left side 116. In at least one example, controller 135 may be located between second speaker driver 136B and camera 133. In various examples, first speaker driver 136A may be disposed at or near an upper display corner region so as to not overlap components in housing 103 for receiving power via support stand 110 (see, e.g., FIGS. 1 and 2).

According to at least one embodiment, display device 102 may also include a low-frequency speaker driver (e.g., a woofer, subwoofer, etc.) disposed at least partially within housing 103 between the display panel 105 and the back side 108. As shown in FIG. 3, for example, display device 102 may include a low-frequency speaker driver 140 positioned to direct sound waves primarily from the back side 108 of housing 103. Low-frequency speaker driver 140 may be positioned in housing 103 so as to produce sound pressure in an interior cavity 143 within housing 103. An acoustic port 142 included within housing 103 may be utilized in conjunction with low-frequency speaker driver 140 to enhance the sound volume and/or quality output by low-frequency speaker driver 140. For example, an acoustic port 142 may be disposed between display panel 105 and back side 108 of housing 103, the acoustic port 142 extending along an arcuate path peripherally surrounding a circumferential portion of the low-frequency speaker driver 140. As will be described in greater detail below, acoustic port 142 may have a port inlet that is open to interior cavity 143 and a port outlet that is open to an exterior of display device 102 via the back side 108 of housing 103. In some examples, first acoustic chamber 138A and second acoustic chamber 138B may be at least partially separated from interior cavity 143 by a barrier that inhibits or prevents sound pressure generated by low-frequency driver 140 in interior cavity 143 from entering first acoustic chamber 138A and second acoustic chamber 138B, and vice-versa.

Figure 4:
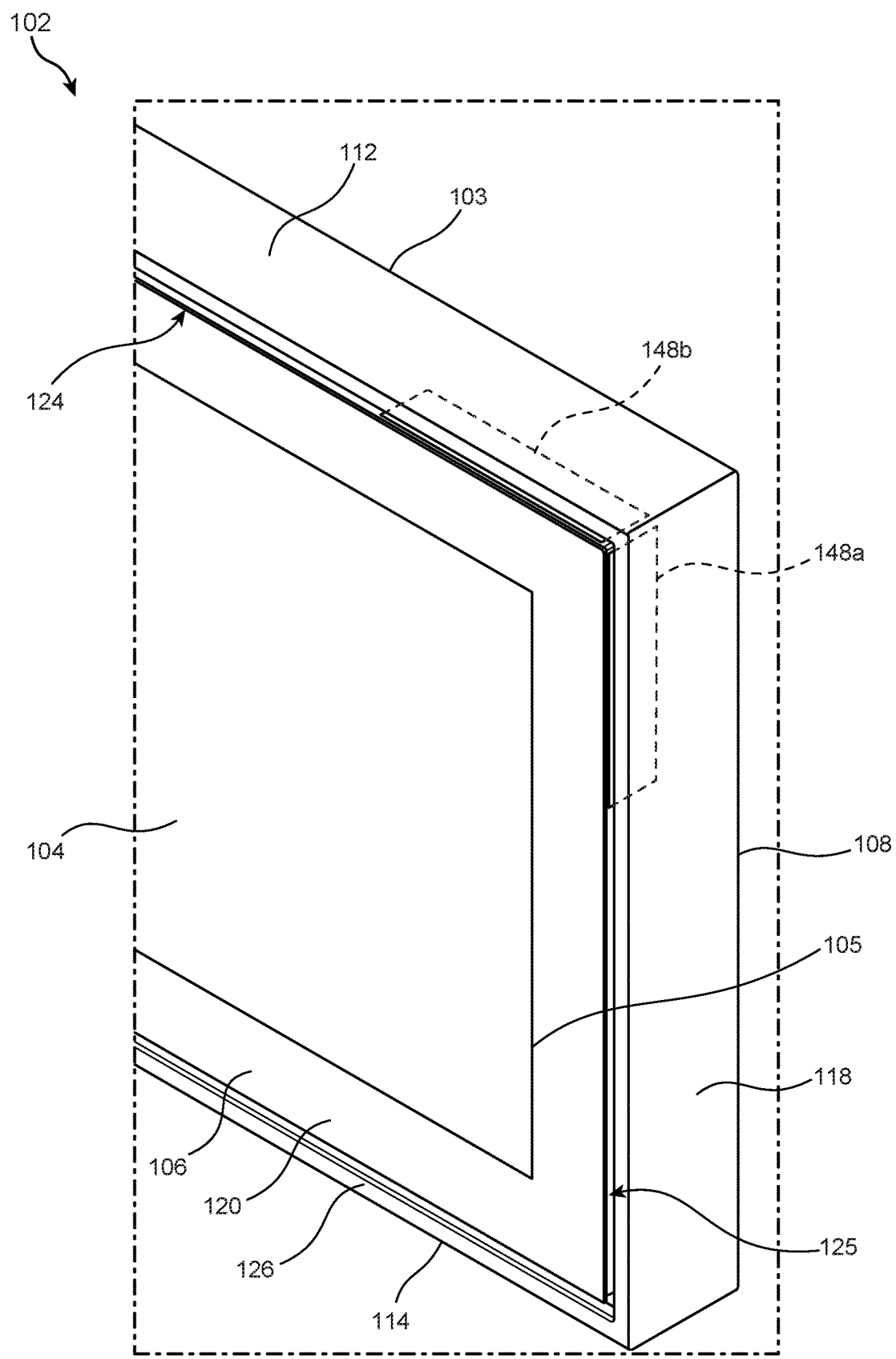
FIG. 4 is a front perspective view of a portion of an exemplary display system according to some embodiments.
Figure 5:
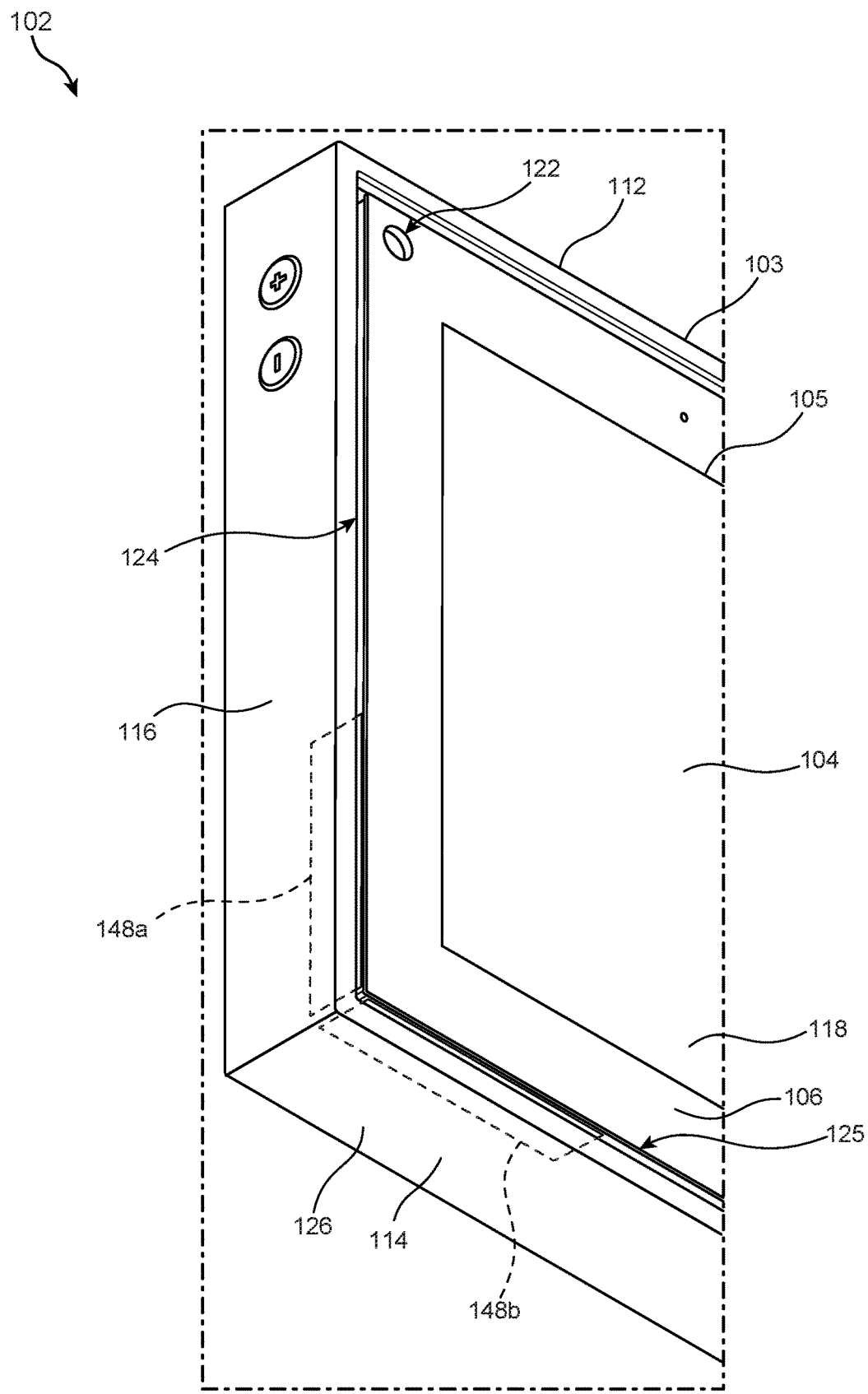
FIG. 5 is a bottom front perspective view of an exemplary display system according to some embodiments.

FIGS. 4 and 5 show enlarged upper-right and lower-left views of portions of display device 102. The figures illustrate details of audio trench 124 and portions of display device 102 surrounding audio trench 124. As shown, audio trench 124 may extend at least partially or fully around a periphery of display panel 105. For example, audio trench 124 may encircle display panel 105 and frame region 120 at front side 106. Audio trench 124 may extend into display device 102 in a rearward direction from trench opening 125 defined between frame region 120 and a surrounding portion of peripheral region 126.

In various embodiments, first acoustic chamber 138A and second acoustic chamber 138B may direct sound produced by first speaker driver 136A and second speaker driver 136B into audio trench 124 via openings along portions of audio trench 124, as will be described in greater detail below. In at least one example, such openings may be covered by a protective layer. For example, FIGS. 4 and 5 show protective coverings 148a and 148b disposed within and/or adjacent to inner peripheral surface regions of audio trench 124 so as to cover corresponding openings between audio trench 124 and each of first acoustic chamber 138A and second acoustic chamber 138B. Protective coverings 148a and 148b may include any suitable single or multi-layer material (e.g., a mesh, fabric, open-cell foam, etc.) that includes a network of openings and that acts as a barrier to prevent or inhibit foreign matter, such as dust and particulates, from entering first acoustic chamber 138A and second acoustic chamber 138B while permitting passage of sound therethrough with little or no interference. Additionally, protective coverings 148a and 148b may visually block an external view of the openings along audio trench 124.

Figure 6:
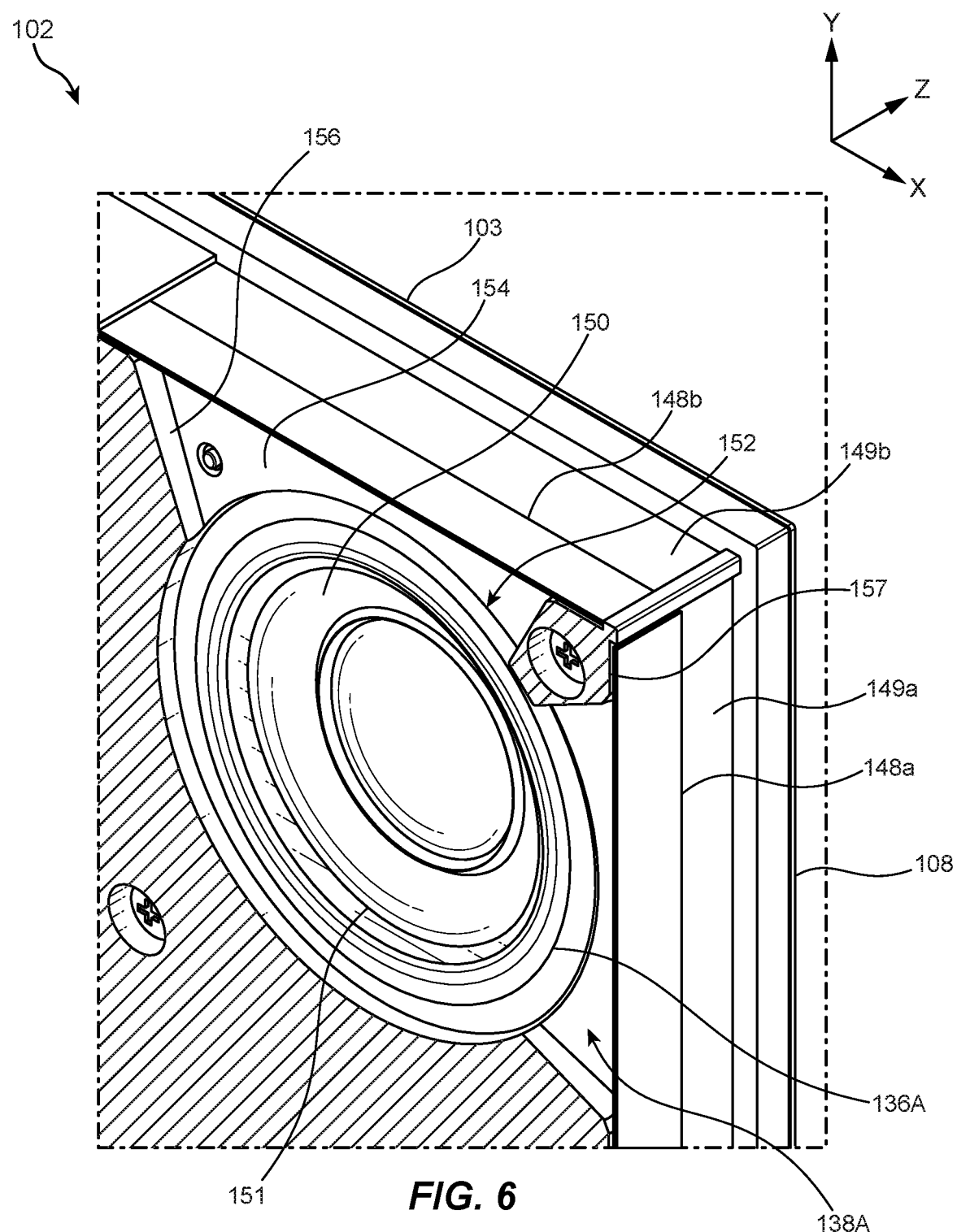
FIG. 6 is a cross-sectional front perspective view of a portion of an exemplary display system according to some embodiments.
Figure 7:
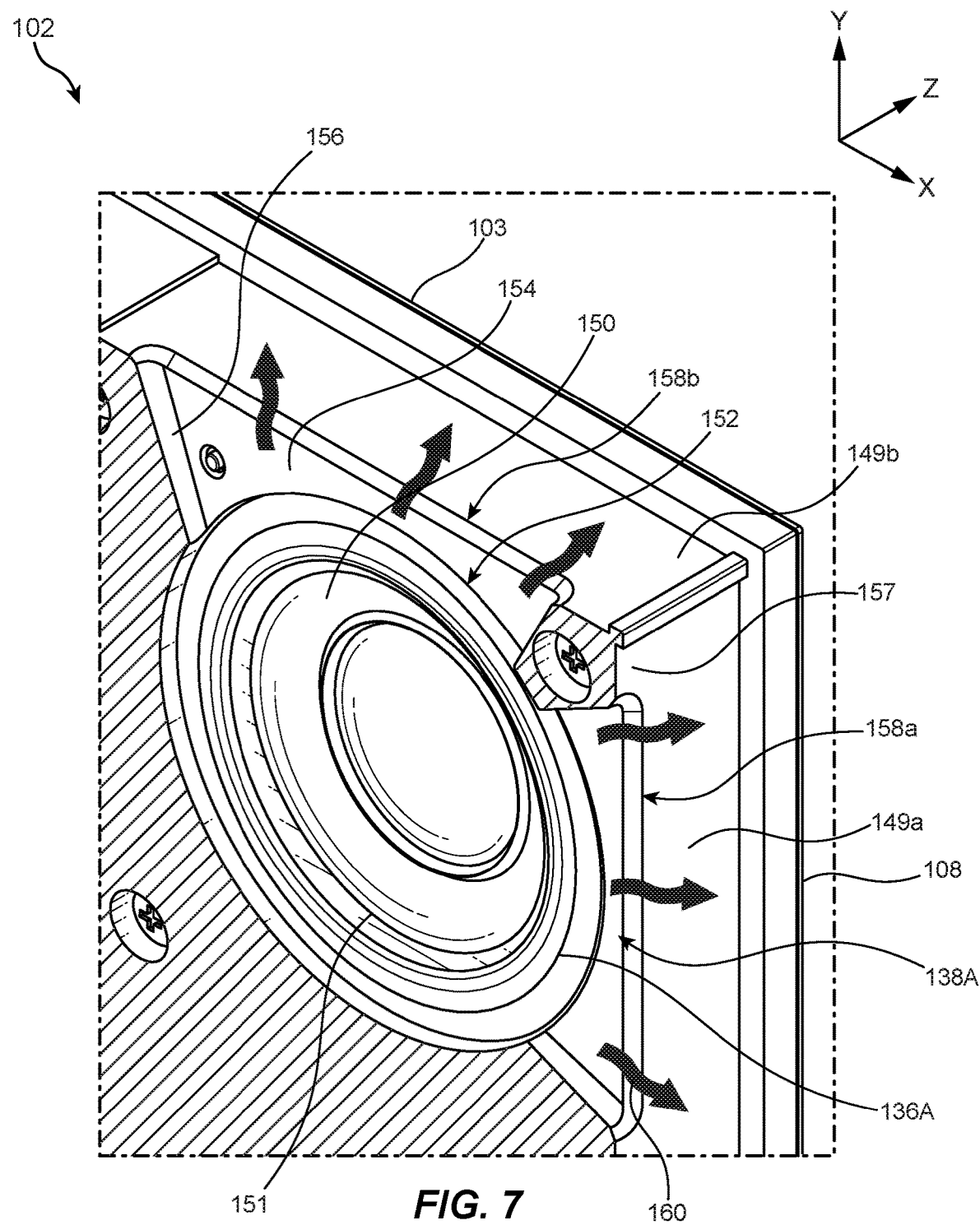
FIG. 7 is a cross-sectional front perspective view of the portion of the display system shown in FIG. 6 according to some embodiments.

FIGS. 6 and 7 illustrate cross-sectional views of an enlarged corner portion of display device 102 adjacent an upper-right corner of audio trench 124 (i.e., near an intersection of top side 112 and right side 118 as shown in FIGS. 4 and 5). While these figures show first speaker driver 136A, first acoustic chamber 138A, and certain surrounding features of display device 102, the same or similar features and configuration may be present in and/or surrounding second speaker driver 136B and second acoustic chamber 138B. As illustrated in FIG. 6, a primary protective covering 148a may be disposed on a primary mounting surface 149a located along a first section of audio trench 124 (i.e., along a portion of audio trench 124 extending near right side 118 as shown) and a secondary protective covering 148b may be disposed on a secondary mounting surface 149b located along a second section of audio trench 124 (i.e., along a portion of audio trench 124 extending near top side 112 as shown). Protective coverings 148a and 148b may be mounted to mounting surfaces 149a and 149b, respectively, in any suitable manner (e.g., via adhesive bonding, mechanical fastening, etc.). Primary protective covering 148a and secondary protective covering 148b may respectively cover primary chamber opening 158a and secondary chamber opening 158b shown in FIG. 7, which shows protective coverings 148a and 148b removed from chamber openings 158a and 158b for purposes of illustration.

As shown in FIGS. 6 and 7, first speaker driver 136A may be disposed within a speaker recess 152 so that a sound radiating surface, such as a forward diaphragm surface 150, of first speaker driver 136A faces first acoustic chamber 138A. First speaker driver 136A and second speaker driver 136B may each be any suitable type of speaker driver, such as a dynamic mid-range speaker, tweeter, midwoofer, or full-range speaker, that produces audible sound waves having frequencies within a range of from about 200 Hz to about 20 kHz. In various examples, first speaker driver 136A and second speaker driver 136B may be electroacoustic transducers that convert electrical signals (e.g., from controller 135 shown in FIG. 3) into sound via forward diaphragm surface 150 of diaphragm 151. In some examples, electrical signals from, for example, controller 135, may be amplified by an amplifier prior to reaching first speaker driver 136A and second speaker driver 136B. The electrical signals may cause a voice coil of first speaker driver 136A and second speaker driver 136B to rapidly move back and forth between poles of a permanent magnet, resulting in rapid movement of diaphragm 151 and production of sound waves from air pressure generated by forward diaphragm surface 150 in each of first and second acoustic chambers 138A and 138B.

First acoustic chamber 138A and second acoustic chamber 138B may be respectively located between front side 106 and/or display panel 105 and each of first speaker driver 136A and/or second speaker driver 136B. Acoustic chambers 138A and 138B may each have any suitable shape and volume. For example, as shown in FIGS. 6 and 7, first acoustic chamber 138A may be narrowest along the illustrated Z-axis between a chamber back surface 154 and a chamber front surface (see, e.g., chamber front surface 155 shown in FIG. 8A). Additionally, first acoustic chamber 138A may extend in the Y- and X-directions from a chamber side surface 156 defining an inner portion of first acoustic chamber 138A to primary chamber opening 158a and secondary chamber opening 158b, which are each open to audio trench 124 (e.g., upper-side and right-side sections of audio trench 124) at a lateral periphery of first acoustic chamber 138A. Primary chamber opening 158a and secondary chamber opening 158b may each provide an acoustic passage for sound waves 160 between first acoustic chamber 138A and audio trench 124, as illustrated in FIG. 7. Primary chamber opening 158a and secondary chamber opening 158b may have any suitable size and shape, such as elongated shapes with rounded end regions extending parallel or substantially parallel to adjacent portions of audio trench 124 as shown. In some examples, primary chamber opening 158a and secondary chamber opening 158b may have a beveled or curved edge portion that tapers and/or widens from first acoustic chamber 138A to audio trench 124.

In some examples, a support section 157 extending from chamber back surface 154 to chamber front surface 155 (see FIG. 8A) may be located between primary chamber opening 158a and secondary chamber opening 158b. Support section 157 may provide structural support at a corner region of first acoustic chamber 138A and/or may provide a surface region for securely mounting adjacent end portions of protective coverings 148a and 148b. While two openings 158a and 158b are illustrated in FIG. 7, any suitable number of openings, such as a single opening (e.g., without support section 157) or more than two openings, may be located between first acoustic chamber 138A and audio trench 124 to pass sound waves from first acoustic chamber 138A to audio trench 124. Accordingly, first acoustic chamber 138A may be shaped and configured to direct the passage of sound waves from first speaker driver 136A to adjacent portions of audio trench 124, such as upper- and right-side sections of audio trench 124, via chamber openings 158a and 158b. Second acoustic chamber 138B may likewise be shaped and configured to direct sound waves from second speaker driver 136B to adjacent portions of audio trench 124, such as lower- and left-side sections of audio trench 124, via corresponding chamber openings (i.e., chamber openings covered by protective coverings 148a and 148b illustrated in FIG. 5).

FIG. 8A is a cross-sectional left side view and FIG. 8B is a cross-sectional right side view of a portion of display device 102 that includes first speaker driver 136A and first acoustic chamber 138A shown in FIGS. 6 and 7. FIG. 8A illustrates a cross-section extending through first acoustic chamber 138A and FIG. 8B illustrates a cross-section extending through a right side portion of acoustic trench 124. As shown in FIGS. 8A and 8B, first acoustic chamber 138A may include a relatively narrow space extending between forward diaphragm surface 150/chamber back surface 154 and chamber front surface 155. As shown, display panel 105 may be disposed between at least a portion of first acoustic chamber 138A and display surface 104. Portions of first speaker driver 136A disposed rearward of chamber front surface 155 may be disposed within housing 103 between back side 108 and first acoustic chamber 138A. In various embodiments, first speaker driver 136A may be centered about a speaker axis 166 that extends substantially normal to front side 106 of housing 103 and/or display surface 104. First speaker driver 136A may extend along speaker axis from forward diaphragm surface 150 to a rear speaker plate 167. In some examples, a cushioning member, such as cushion layer 168, may be disposed adjacent to rear speaker plate 167 to dampen vibrations generated by first speaker driver 136A during use. For example, cushion layer 168 may be disposed between rear speaker plate 167 and an inner surface of housing 103 at back side 108.

In some embodiments, sound waves produced by first speaker driver 136A may be directed from first acoustic chamber 138A to audio trench 124 in directions generally or substantially perpendicular to speaker axis 166 (i.e., generally or substantially parallel to a plane defined by the X- and Y-axes in FIGS. 6-8B). FIGS. 8A and 8B illustrate exemplary paths of sound waves 160 passing through secondary chamber opening 158b from first acoustic chamber 138A to audio trench 124. Sound waves may likewise pass through primary chamber opening 158a from first acoustic chamber 138A to audio trench 124.

Audio trench 124 may have any suitable cross-sectional shape extending inwardly from the trench opening 125. In some examples, audio trench 124 may taper between trench opening 125 and a narrower region disposed inwardly from the trench opening 125. Audio trench 124 may extend to any suitable depth from trench opening 125 that is sufficient to permit passage of sound waves from first acoustic chamber 138A. For example, as shown in FIGS. 8A and 8B, audio trench 124 may extend beyond primary chamber opening 158a and secondary chamber opening 158b toward back side 108 so as to provide a greater spatial volume to facilitate reverberation and disbursement of the sound waves within and along audio trench 124, thereby creating a larger region of sound emission from audio trench 124. Such a configuration may enhance a user's audio experience by providing sound emission from around a greater region of display panel 105 and further increasing a left-right balance of sounds emitted by first speaker driver 136A, which is located at the upper right region of housing 103, and second speaker driver 136B, which is located at the lower left region of housing 103.

Emitted sound waves 164 may be pass from audio trench 124 to an external environment via trench opening 125 defined in front side 106 between frame region 120 and peripheral region 126. In some examples, emitted sound waves 164 may exit audio trench 124 in directions that are generally perpendicular to sound waves 160 passing from first acoustic chamber 138A to audio trench 124. Accordingly, emitted sound waves 164 exiting audio trench 124 may be clearly heard by users viewing and/or interacting with content displayed on display panel 105.

Figure 9:
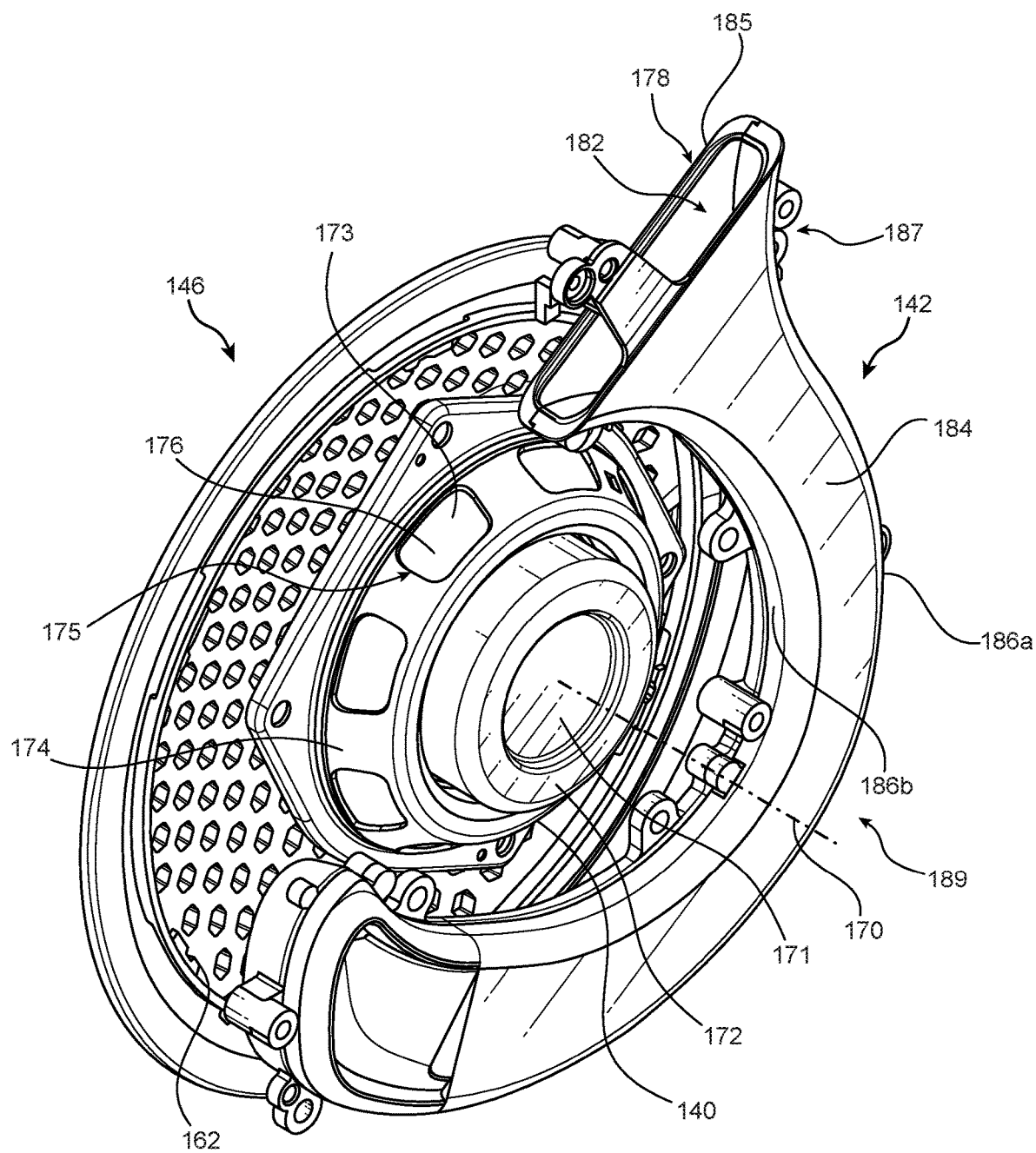
FIG. 9 is a perspective view showing a speaker driver, audio port, and speaker grille of an exemplary display system according to some embodiments.
Figure 10:
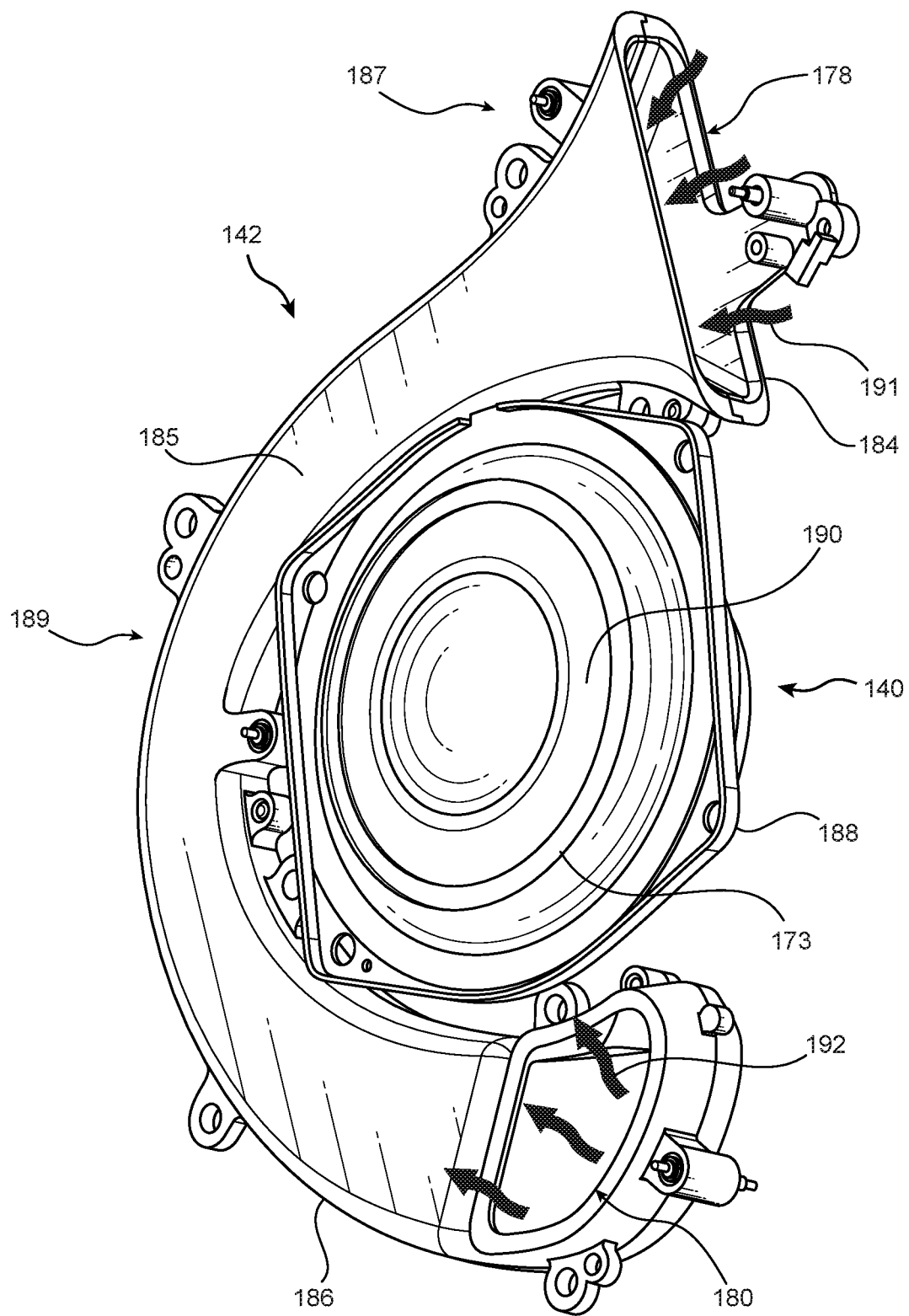
FIG. 10 is a perspective view showing speaker driver and audio port of an exemplary display system according to some embodiments.
Figure 11:
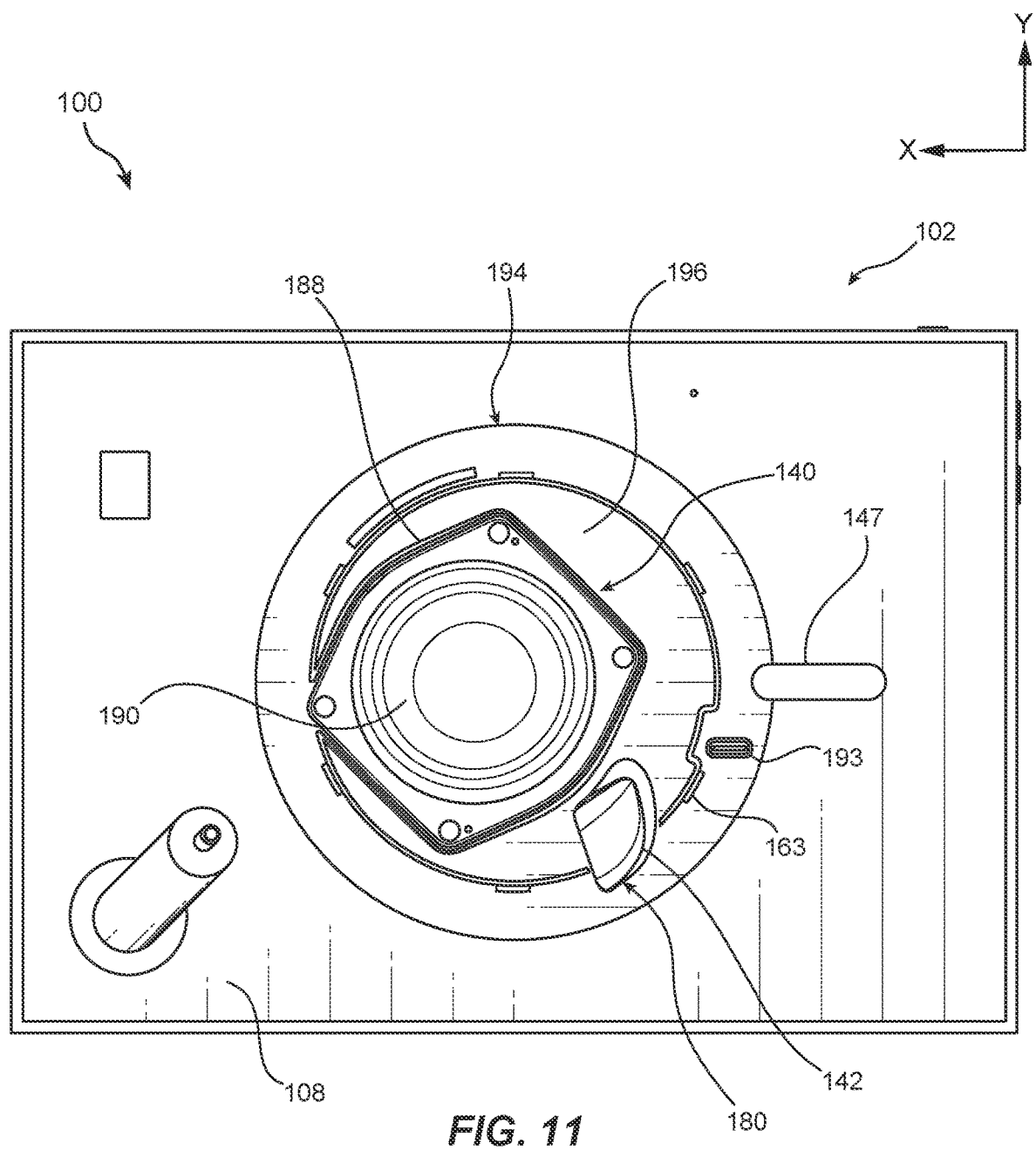
FIG. 11 is a rear view of an exemplary display system according to some embodiments.

FIGS. 9-11 illustrate an exemplary low-frequency speaker driver 140 and acoustic port 142 disposed within display device 102 in accordance with some embodiments. Low-frequency speaker driver 140 and acoustic port 142 are shown in each of these figures as they are disposed in relation to each other within display device 102. FIGS. 9 and 10 show low-frequency speaker driver 140 and acoustic port 142 separated from other portions of display device 102 for purposes of illustration and FIG. 11 shows low-frequency speaker driver 140 and acoustic port 142 mounted in display device 102.

Low-frequency speaker driver 140 may be disposed at least partially within housing 103 between display panel 105 and back side 108. Low-frequency speaker driver 140 may include a diaphragm 173 having a sound radiating surface, such as forward diaphragm surface 190 shown in FIGS. 10 and 11, that is positioned and oriented to direct sound waves from the back side 108 of housing 103. Additionally diaphragm 173 may have a rear diaphragm surface 176, as shown in FIG. 9, that is positioned to produce sound pressure in an interior cavity 143 within housing 103. In at least one example, rear diaphragm surface 176 may be open to cavity 143 via frame openings 175 in speaker frame 174 surrounding diaphragm 173. Low-frequency speaker driver 140 may be any suitable type of speaker driver, such as a standard woofer, midwoofer, or subwoofer, that produces audible sound waves having frequencies within a range of from about 10 Hz to about 5 kHz. In various examples, low-frequency speaker driver 140 may be an electroacoustic transducer that converts electrical signals (e.g., from controller 135 shown in FIG. 3) into sound via diaphragm 173. According to at least one embodiment, low-frequency speaker driver 140 may be centered about a speaker axis 170 (see FIG. 9) extending from forward diaphragm surface 190 to a rear speaker surface 172 in a direction substantially normal to back side 108 of housing 103.

In some examples, electrical signals from, for example, controller 135, may be amplified by an amplifier prior to reaching low-frequency speaker driver 140. Additionally, in certain examples, an audio crossover of display device 102 may split an electrical signal from controller 135 into at least two frequency ranges, with frequencies in a higher frequency range being sent to first speaker driver 136A and second speaker driver 136B and frequencies in a lower frequency range being sent to low-frequency speaker driver 140. The electrical signals received by low-frequency speaker driver 140 may cause a voice coil of low-frequency speaker driver 140 to move back and forth rapidly between poles of a permanent magnet, resulting in rapid movement of diaphragm 173 and production of sound waves from both forward diaphragm surface 190 and rear diaphragm surface 176. In some examples, a thermally-conductive member (e.g., a copper member, such as a layer of copper tape) may be disposed adjacent to rear speaker surface 172 to dissipate heat generated by low-frequency speaker driver 140 during use. Additionally or alternatively, a central surface 171 located about speaker axis 170 at the rear of low-frequency speaker driver 140 may abut a cushioning thermal stack that further dissipates heat and dampens vibrations generated by low-frequency speaker driver 140 during operation. In at least one example, the cushioning thermal stack may include, for example, a conductive fabric layer, a copper tape layer, and a thermal interface material (TIM) to facilitate heat transfer between central surface 171 and the cushioning thermal stack.

As shown in FIG. 11, low-frequency speaker driver 140 may be mounted to a mounting surface 196 on back side 108 of housing 103. For example, a hole may extend through mounting surface 196 to accommodate portions of low-frequency speaker driver 140 within housing 103. Low-frequency speaker driver 140 may be mounted to low-frequency speaker driver 140 via a mounting member 188, which may be screwed, bolted, and/or mechanically fastened to mounting surface 196. As shown, forward diaphragm surface 190 of low-frequency speaker driver 140 may face outward from back side 108 to produce sound that is audible to users viewing and/or interacting with content displayed on display panel 105 and/or played by speaker drivers (e.g., speaker drivers 136A and 136B) disposed within housing 103. Other portions of low-frequency speaker driver 140 may be disposed within interior cavity 143 of display panel 105.

As shown in FIG. 9, low-frequency speaker driver 140 may be covered by speaker grille 146, which may be positioned in low-frequency speaker opening 194 on back side 108 of housing 103 in any suitable manner. For example, speaker grille 146 may be mechanically secured to housing 103 with a peripheral edge of speaker grille 146 disposed within low-frequency speaker opening 194. In at least one example, speaker grille 146 may include attachment protrusions 162 that may be aligned with corresponding attachment protrusions 163 on back side 108 of housing 103 to enable ready attachment and removal of speaker grille 146 by a user. For example, attachment protrusions 162 and attachment protrusions 163 may be fastened to each other by placing speaker grille 146 in low-frequency speaker opening 194 and rotating speaker grille 146 in a clockwise or counter-clockwise direction until attachment protrusions 163 overlap and interlock with the corresponding attachment protrusions 162. In some examples, a connector socket (e.g., a USB port, an HDMI port, etc.) may also be disposed near low-frequency speaker driver 140 so as to be accessible by removing speaker grille 146.

Speaker grille 146 may include any suitable materials and construction that allows substantially unimpeded transmission of sound waves from low-frequency speaker driver 140 to an external environment while covering low-frequency speaker driver 140 to visually hide low-frequency speaker driver 140 and/or to protect it from damage by preventing contact with objects and/or particulates (e.g., dust, etc.) in the external environment. In some embodiments, speaker grille 146 may include a rigid member (e.g., plastic, metal, etc.) having a pattern of holes facilitating transmission of sound waves therethrough. In certain examples, speaker grille 146 may also include a fabric layer disposed over the rigid member to visually obscure an external view of components covered by speaker grille 146.

In various examples, interior cavity 143 may function as an enclosure space having a volume and internal layout suitable to prevent or inhibit undesirable interference between sound waves emitted from rear diaphragm surface 176 and sound waves emitted from forward diaphragm surface 190 of low-frequency speaker driver 140. Interior cavity 143 may also function to minimize effects of vibration (e.g., due to vibrations of frame 174 and/or other portions of low-frequency speaker driver 140, and/or due to movements of an airmass within interior cavity 143) and/or heat generation developed during operation of low-frequency speaker driver 140.

In some examples, an acoustic port may be utilized to enhance the sound volume and/or sound quality output by low-frequency speaker driver 140. For example, an acoustic port 142 may be disposed between the display panel 105 and the back side 108 of the housing 103, the acoustic port 142 extending along an arcuate path peripherally surrounding a portion of the low-frequency speaker driver 140. Exemplary entering sound waves 191 may enter acoustic port 142 via port inlet 178, which is open to interior cavity 143 of housing 103 (see FIG. 3), and may pass through a port interior 182 defined within acoustic port 142 as shown in FIGS. 9 and 10. Acoustic port 142 may extend from port inlet 178 to a port outlet 180 that emits exiting sound waves 192 through an opening extending through back side 108 of the housing 103. As shown in FIG. 11, port outlet 180 may be located near low-frequency speaker driver 140 in a region that may be covered by speaker grille 146. Acoustic port 142 may produce air resonance within acoustic port 142 via Helmholtz resonance as sound pressure from rear diaphragm surface 176 of diaphragm 173 is directed across port inlet 178. The corresponding audio output from acoustic port 142 may add to and increase the overall volume produced by low-frequency speaker driver 140 while maintaining audio quality, thereby increasing the audio capabilities of low-frequency speaker driver 140 using a relatively limited space available within housing 103.

In certain embodiments, the acoustic port 142 may extend along a plane that is substantially parallel to at least one of the front side 106 or the back side 108 of housing 103 (e.g., a plane substantially extending in the X- and Y-axis directions illustrated in FIG. 11). For example, acoustic port 142 may include a front port surface 184 and a back port surface 185 that are each substantially parallel to at least one of the front side 106 or the back side 108 of housing 103. Additionally, in some examples, acoustic port 142 may have generally arcuate side portions, including outer side port surface 186a and inner side port surface 186b, that extend along a curved path between front port surface 184 and back port surface 185.

In at least one example, port inlet 178 may be defined between front port surface 184 and back port surface 185 at a first end of acoustic port 142. Additionally, port outlet 180 may be defined between back port surface 185 and an end of acoustic port 142 opposite port inlet 178 (see, e.g., FIG. 10). Acoustic port 142 may have any suitable shape that is determined to provide enhanced, optimal, and/or substantially optimal sound quality in a relatively lower audio frequency range (e.g., from about 10 Hz to about 2 kHz). In various examples, acoustic port 142 may taper from wider regions at or near port inlet 178 and port outlet 180 to a narrower central port region 189 at or near a central portion of acoustic port 142 between port inlet 178 and port outlet 180. In some examples, acoustic port 142 may include a flared region 187 (e.g., a generally bell-shaped region that tapers in a nonlinear fashion) at port inlet 178 that prevents or inhibits development of turbulent air flow into and/or through acoustic port 142 due to sound pressure developed within interior cavity 143 by low-frequency speaker driver 140. Additionally, the shape of acoustic port 142 along its length may prevent or inhibit turbulent airflow through port interior 182 of acoustic port 142, facilitating optimal or substantially optimal conveyance of sound waves through acoustic port 142 with minimal interference and degradation in sound quality.

In various embodiments, rather than being configured to emit sound waves in a direction that is generally aligned with the curved path of acoustic port 142 in accordance with conventional audio port designs, port outlet 180 may extend through back port surface 185 to force exiting sound waves 192 in a direction that veers substantially from that of the preceding path direction. For example, as illustrated in FIG. 10, exiting sound waves 192 may be emitted from port outlet 180 in directions that are generally perpendicular to an immediately preceding path direction through acoustic port 142. Accordingly, the shape of acoustic port 142 may be configured to optimize passage of sound waves into and through port interior 182 of acoustic port 142 while reducing the overall size and/or spatial requirements of acoustic port 142 so as to reduce the thickness of surrounding interior cavity 143 and an overall thickness of display device 102 between front side 106 and back side 108. Additionally, acoustic port 142 may direct the emission of exiting sound waves 192 through back side 108 of housing 103 with little or no impact on the resulting sound quality.

Figure 12:
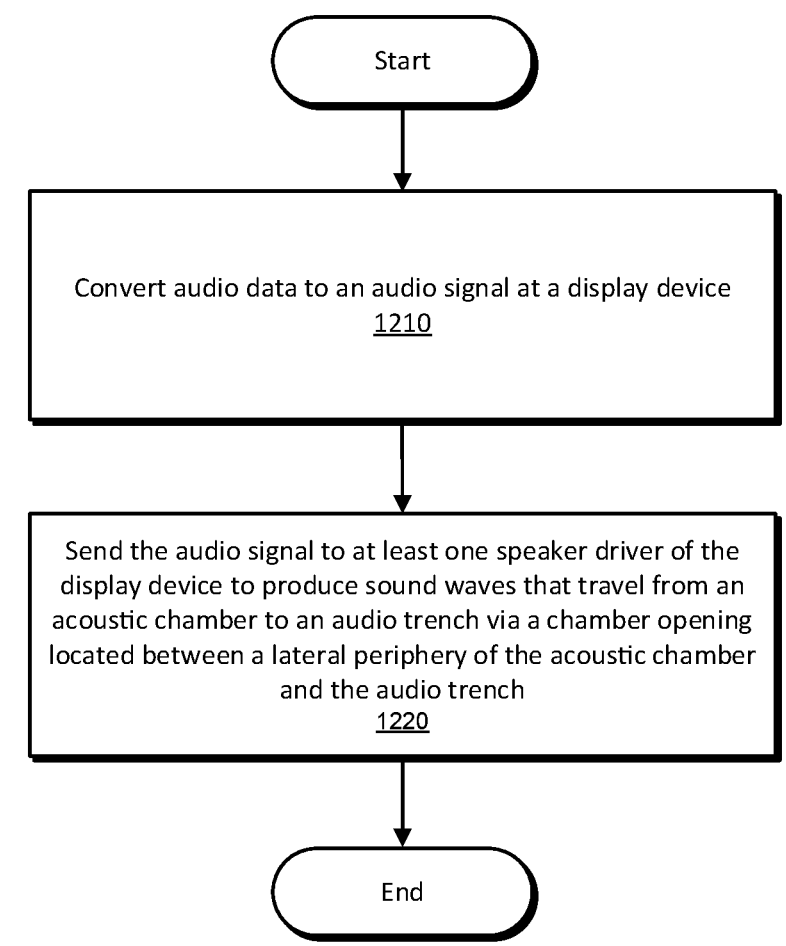
FIG. 12 is a flow diagram of an exemplary method for producing audio in a display system according to some embodiments.

FIG. 12 is a flow diagram of an exemplary method 1200 for producing audio in a display system in accordance with some embodiments. As illustrated in FIG. 12, at step 1210, the method may include converting audio data to an audio signal at a display device. For example, digital audio data received by or stored on display device 102 may be converted to audio signals by, for example, controller 135 (see, e.g., FIG. 3). In some examples, a signal may be further amplified (e.g., via an amplifier) and/or split into at least two frequency ranges (e.g., using an audio crossover) to provide a frequency range to low-frequency speaker driver 140 that is different than a frequency range sent to first speaker driver 136A and/or second speaker driver 136B.

In at least one embodiment, the display device may include (i) a housing 103 surrounding at least a portion of a display panel 105, the housing 103 including a front side 106 having a frame region 120 located between the display panel 105 and a peripheral region 126, (ii) an audio trench 124 peripherally surrounding at least a portion of the display panel 105, the audio trench 124 including a trench opening 125 in the front side 106 between the frame region 120 and the peripheral region 126, (iii) at least one speaker driver (e.g., first speaker driver 136A, second speaker driver 136B) disposed behind the display panel 105, and (iv) an acoustic chamber (e.g., first acoustic chamber 138A, second acoustic chamber 138B) defined between the at least one speaker driver and the display panel (see, e.g., FIGS. 1-8B).

At step 1220, the audio signal may be sent to the at least one speaker driver to produce sound waves that travel from the acoustic chamber to the audio trench via a chamber opening located between a lateral periphery of the acoustic chamber and the audio trench. For example, an audio signal generated by controller 135 may be sent to first speaker driver 136A and/or second speaker driver 136B to produce sound waves that travel from acoustic chamber first acoustic chamber 138A and/or second acoustic chamber 138B to audio trench 124 via a chamber opening (e.g., primary chamber opening 158a, secondary chamber opening 158b) located between a lateral periphery of the acoustic chamber and an adjacent portion of audio trench 124 (see, e.g., FIG. 6-8B).

In some embodiments, an additional audio signal may be sent to a low-frequency speaker driver 140. The low-frequency speaker driver 140 may be at least partially surrounded by the housing 103, the low-frequency speaker driver 140 including a diaphragm 173 that directs sound waves from the back side 108 of the housing 103 in response to the additional audio signal (see, e.g., FIGS. 9-11).

Display devices including audio components and systems arranged and utilized as described herein may enable the displays devices to be reduced in size and physical profile while delivering enhanced sound quality to users. Accordingly, the disclosed display devices may provide an improved multimedia experience to users without necessitating a larger media device or connection to additional peripheral loudspeaker devices. Additionally, the audio components may be disposed within the display device housing so as to reduce or eliminate their visibility from the user's perspective. In various embodiments, multiple speaker drivers housed in opposite sides and/or corners of the display device may be operated in conjunction with each other to deliver an engaging and immersive audio experience.

EXAMPLE EMBODIMENTS

Example 1

A display device includes (i) a display panel and (ii) a housing surrounding at least a portion of the display panel, the housing including (a) a peripheral region including lateral sides of the housing, (b) a front side including a frame region located between the display panel and the peripheral region, and (c) a back side. The display device further includes (iii) an audio trench peripherally surrounding at least a portion of the display panel, the audio trench including a trench opening in the front side between the frame region and the peripheral region, and (iv) at least one speaker driver disposed between the display panel and the back side, the at least one speaker driver including a sound radiating surface positioned to direct sound waves into an acoustic chamber defined between the at least one speaker driver and the display panel, wherein a chamber opening is located between a lateral periphery of the acoustic chamber and the audio trench.

Example 2

The display device of example 1, wherein audio trench laterally surrounds a majority of the display panel.

Example 3

The display device of example 1 or example 2, wherein the audio trench tapers between the trench opening and a narrower portion disposed inwardly from the trench opening.

Example 4

The display device of any one of examples 1-3, wherein the at least one speaker driver includes a pair of speaker drivers and each of the pair of speaker drivers is positioned to direct sound waves into a separate acoustic chamber of a pair of acoustic chambers.

Example 5

The display device of example 4, wherein the audio trench extends around the lateral periphery of the display panel from a region adjacent a first acoustic chamber of the pair of acoustic chambers to another region adjacent a second acoustic chamber of the pair of acoustic chambers.

Example 6

The display device of example 5, wherein at least a first chamber opening provides an acoustic passage between the first acoustic chamber and the audio trench and at least a second chamber opening provides another acoustic passage between the second acoustic chamber and the audio trench.

Example 7

The display device of any one of examples 4-6, wherein (i) the housing includes four lateral sides forming a substantially rectangular peripheral profile, (ii) a first speaker driver of the pair of speaker drivers is located nearest an intersection of a first lateral side and a second lateral side of the four lateral sides, and (iii) a second speaker driver of the pair of speaker drivers is located nearest an intersection of a third lateral side and a fourth lateral side of the four lateral sides.

Example 8

The display device of example 7, further including a camera disposed within the housing and located nearest an intersection of the first lateral side and the third lateral side of the four lateral sides.

Example 9

The display device of any one of examples 1-8, wherein the audio trench includes a first section extending parallel to a first lateral side of the housing and a second section extending substantially perpendicular to the first section and substantially parallel to a second lateral side of the housing.

Example 10

The display device of example 9, wherein at a primary chamber opening provides an acoustic passage between the acoustic chamber and the first section of the audio trench and a secondary chamber opening provides another acoustic passage between the acoustic chamber and the second section of the audio trench.

Example 11

The display device of any one of examples 1-10, wherein the speaker driver is centered about a speaker axis that extends substantially normal to the front side of the housing.

Example 12

The display device of example 11, wherein the sound waves are directed from the acoustic chamber to the audio trench in directions substantially perpendicular to the speaker axis.

Example 13

The display device of any one of examples 1-12, further including (i) a low-frequency speaker driver that is at least partially surrounded by the housing, the low-frequency speaker driver including a diaphragm having an external surface positioned to direct sound waves from the back side of the housing and an internal surface positioned to produce sound pressure in an interior cavity within the housing, and (ii) an acoustic port disposed between the display panel and the back side of the housing, the acoustic port extending along an arcuate path peripherally surrounding a portion of the low-frequency speaker driver from a port inlet open to the interior cavity to a port outlet extending through the back side of the housing.

Example 14

A display device including (i) a display panel and (ii) a housing surrounding at least a portion of the display panel, the housing including (a) a front side, (b) a back side, and (c) lateral sides extending between the front side and the back side. The display device further includes (iii) a low-frequency speaker driver that is at least partially surrounded by the housing, the low-frequency speaker driver including a diaphragm having an external surface positioned to direct sound waves from the back side of the housing and an internal surface positioned to produce sound pressure in an interior cavity within the housing, and (iv) an acoustic port disposed between the display panel and the back side of the housing, the acoustic port extending along an arcuate path peripherally surrounding a portion of the low-frequency speaker driver, the acoustic port extending from a port inlet open to the interior cavity to a port outlet extending to an opening in the back side of the housing.

Example 15

The display device of example 14, wherein the acoustic port extends substantially parallel to at least one of the front side or the back side of the housing.

Example 16

The display device of example 15, wherein the acoustic port includes a front surface and a back surface that are each substantially parallel to at least one of the front side or the back side of the housing.

Example 17

The display device of example 16, wherein (i) the port inlet is defined between the front surface and the back surface at a first end of the acoustic port and (ii) the port outlet is defined between the back surface and a second end of the acoustic port.

Example 18

The display device of any one of examples 14-17, wherein the acoustic port is flared at the port inlet.

Example 19

A method includes converting audio data to an audio signal at a display device, the display device including (i) a housing surrounding at least a portion of a display panel, the housing including a front side having a frame region located between the display panel and a peripheral region, (ii) an audio trench peripherally surrounding at least a portion of the display panel, the audio trench including a trench opening in the front side between the frame region and the peripheral region, (iii) at least one speaker driver disposed behind the display panel, and (iv) an acoustic chamber defined between the at least one speaker driver and the display panel. The method also includes sending the audio signal to the at least one speaker driver to produce sound waves that travel from the acoustic chamber to the audio trench via a chamber opening located between a lateral periphery of the acoustic chamber and the audio trench.

Example 20

The method of example 19, further including sending an additional audio signal to a low-frequency speaker driver, wherein the low-frequency speaker driver that is at least partially surrounded by the housing, the low-frequency speaker driver including a diaphragm that directs sound waves from the back side of the housing in response the additional audio signal.

Computing devices and systems described and/or illustrated herein, such as those included in the illustrated display devices, broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A display device comprising:
a display panel;
a housing surrounding at least a portion of the display panel, the housing comprising:

a peripheral region including lateral sides of the housing;
a front side comprising a frame region located between the display panel and the peripheral region; and
a back side;
an audio trench peripherally surrounding at least a portion of the display panel, the audio trench including a trench opening in the front side between the frame region and the peripheral region; and
at least one speaker driver disposed between the display panel and the back side, the at least one speaker driver comprising a sound radiating surface positioned to direct sound waves into an acoustic chamber defined between the at least one speaker driver and the display panel, wherein a chamber opening is located between a lateral periphery of the acoustic chamber and the audio trench.

2. The display device of claim 1, wherein audio trench laterally surrounds a majority of the display panel.

3. The display device of claim 1, wherein the audio trench tapers between the trench opening and a narrower portion disposed inwardly from the trench opening.

4. The display device of claim 1, wherein:
the at least one speaker driver comprises a pair of speaker drivers; and
each of the pair of speaker drivers is positioned to direct sound waves into a separate acoustic chamber of a pair of acoustic chambers.

5. The display device of claim 4, wherein the audio trench extends around the lateral periphery of the display panel from a region adjacent a first acoustic chamber of the pair of acoustic chambers to another region adjacent a second acoustic chamber of the pair of acoustic chambers.

6. The display device of claim 5, wherein at least a first chamber opening provides an acoustic passage between the first acoustic chamber and the audio trench and at least a second chamber opening provides another acoustic passage between the second acoustic chamber and the audio trench.

7. The display device of claim 4, wherein:
the housing comprises four lateral sides forming a substantially rectangular peripheral profile;
a first speaker driver of the pair of speaker drivers is located nearest an intersection of a first lateral side and a second lateral side of the four lateral sides; and
a second speaker driver of the pair of speaker drivers is located nearest an intersection of a third lateral side and a fourth lateral side of the four lateral sides.

8. The display device of claim 7, further comprising a camera disposed within the housing and located nearest an intersection of the first lateral side and the third lateral side of the four lateral sides.

9. The display device of claim 1, wherein the audio trench comprises a first section extending parallel to a first lateral side of the housing and a second section extending substantially perpendicular to the first section and substantially parallel to a second lateral side of the housing.

10. The display device of claim 9, wherein a primary chamber opening provides an acoustic passage between the acoustic chamber and the first section of the audio trench and a secondary chamber opening provides another acoustic passage between the acoustic chamber and the second section of the audio trench.

11. The display device of claim 1, wherein the speaker driver is centered about a speaker axis that extends substantially normal to the front side of the housing.

12. The display device of claim 11, wherein the sound waves are directed from the acoustic chamber to the audio trench in directions substantially perpendicular to the speaker axis.

13. The display device of claim 1, further comprising:
a low-frequency speaker driver that is at least partially surrounded by the housing, the low-frequency speaker driver comprising a diaphragm having an external surface positioned to direct sound waves from the back side of the housing and an internal surface positioned to produce sound pressure in an interior cavity within the housing; and
an acoustic port disposed between the display panel and the back side of the housing, the acoustic port extending along an arcuate path peripherally surrounding a portion of the low-frequency speaker driver from a port inlet open to the interior cavity to a port outlet extending through the back side of the housing.

14. A display device comprising:
a display panel;
a housing surrounding at least a portion of the display panel, the housing comprising:
a front side;
a back side; and
lateral sides extending between the front side and the back side;
a low-frequency speaker driver that is at least partially surrounded by the housing, the low-frequency speaker driver comprising a diaphragm having an external surface positioned to direct sound waves from the back side of the housing and an internal surface positioned to produce sound pressure in an interior cavity within the housing; and
an acoustic port disposed between the display panel and the back side of the housing, the acoustic port extending along an arcuate path peripherally surrounding a portion of the low-frequency speaker driver, the acoustic port extending from a port inlet open to the interior cavity to a port outlet extending to an opening in the back side of the housing.

15. The display device of claim 14, wherein the acoustic port extends substantially parallel to at least one of the front side or the back side of the housing.

16. The display device of claim 15, wherein the acoustic port comprises a front surface and a back surface that are each substantially parallel to at least one of the front side or the back side of the housing.

17. The display device of claim 16, wherein:
the port inlet is defined between the front surface and the back surface at a first end of the acoustic port; and
the port outlet is defined between the back surface and a second end of the acoustic port.

18. The display device of claim 14, wherein the acoustic port is flared at the port inlet.

19. A method comprising:
providing a display device comprising:
a housing surrounding at least a portion of a display panel, the housing comprising a front side having a frame region located between the display panel and a peripheral region;
an audio trench peripherally surrounding at least a portion of the display panel, the audio trench including a trench opening in the front side between the frame region and the peripheral region;
at least one speaker driver disposed behind the display panel; and an acoustic chamber defined between the at least one speaker driver and the display panel;

converting audio data to an audio signal at the display device; and sending the audio signal to the at least one speaker driver to produce sound waves that travel from the acoustic chamber to the audio trench via a chamber opening located between a lateral periphery of the acoustic chamber and the audio trench.

20. The method of claim 19, further comprising sending an additional audio signal to a low-frequency speaker driver, wherein the low-frequency speaker driver that is at least partially surrounded by the housing, the low-frequency speaker driver comprising a diaphragm that directs sound waves from the back side of the housing in response to the additional audio signal.

\* \* \* \* \*